US008921512B2

(12) United States Patent
Mallon

(10) Patent No.: US 8,921,512 B2
(45) Date of Patent: Dec. 30, 2014

(54) PROCESS FOR FORMING AN ARAMID COPOLYMER

(75) Inventor: Frederick K Mallon, Midlothian, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 222 days.

(21) Appl. No.: 13/559,659

(22) Filed: Jul. 27, 2012

(65) Prior Publication Data

US 2013/0197147 A1 Aug. 1, 2013

Related U.S. Application Data

(60) Provisional application No. 61/512,977, filed on Jul. 29, 2011, provisional application No. 61/512,974, filed on Jul. 29, 2011.

(51) Int. Cl.

| | |
|---|---|
| ***C08G 73/00*** | (2006.01) |
| ***C08G 69/00*** | (2006.01) |
| ***C08G 73/18*** | (2006.01) |
| ***C08G 69/28*** | (2006.01) |
| ***C08G 69/32*** | (2006.01) |

(52) U.S. Cl.

CPC ................ *C08G 69/28* (2013.01); *C08G 69/00* (2013.01); *C08G 73/18* (2013.01); *C08G 69/32* (2013.01)

USPC .......................................... 528/422; 528/371

(58) Field of Classification Search

USPC .......................................... 524/422; 528/371

See application file for complete search history.

(56) References Cited

U.S. PATENT DOCUMENTS

| | | | | |
|---|---|---|---|---|
| 3,063,966 | A | 11/1962 | Du Pont | |
| 3,227,793 | A | 1/1966 | Cipriani | |
| 3,414,645 | A | 12/1968 | Morgan | |
| 3,600,350 | A | 8/1971 | Kwolek | |
| 3,767,756 | A | 10/1973 | Blades | |
| 4,018,735 | A | 4/1977 | Nakagawa et al. | |
| 4,172,938 | A | 10/1979 | Mera | |
| 5,233,004 | A | 8/1993 | Dembek et al. | |
| 5,474,842 | A | 12/1995 | Hoiness | |
| 5,571,891 | A | 11/1996 | Jung et al. | |
| 5,646,234 | A | 7/1997 | Jung et al. | |
| 5,667,743 | A | 9/1997 | Tai et al. | |
| 5,811,042 | A | 9/1998 | Hoiness | |
| 2003/0064316 | A1 | 4/2003 | Zebala | |
| 2010/0029159 | A1 * | 2/2010 | Ishihara et al. | 442/301 |
| 2011/0046340 | A1 * | 2/2011 | De Vos et al. | 528/372 |

FOREIGN PATENT DOCUMENTS

| | | |
|---|---|---|
| CN | 101165078 | 4/2008 |
| CN | 101787582 | 7/2010 |
| RU | 2017866 | 8/1994 |
| RU | 2045586 | 10/1995 |
| RU | 2285760 | 10/2006 |
| RU | 2285761 | 10/2006 |
| WO | WO2005/054337 | 6/2005 |
| WO | WO2005054337 | 6/2005 |
| WO | WO2008105547 | 9/2008 |

OTHER PUBLICATIONS

U.S. Appl. No. 13/559,698, filed Jul. 27, 2012, DuPont.
U.S. Appl. No. 13/559,696, filed Jul. 27, 2012, DuPont.
U.S. Appl. No. 13/559,691, filed Jul. 27, 2012, DuPont.
U.S. Appl. No. 13/559,678, filed Jul. 27, 2012, DuPont.
U.S. Appl. No. 13/559,684, filed Jul. 27, 2012, DuPont.
U.S. Appl. No. 13/559,681, filed Jul. 27, 2012, DuPont.
U.S. Appl. No. 13/559,674, filed Jul. 27, 2012, DuPont.
U.S. Appl. No. 13/559,669, filed Jul. 27, 2012, DuPont.
U.S. Appl. No. 13/559,667, filed Jul. 27, 2012, DuPont.
U.S. Appl. No. 13/559,661, filed Jul. 27, 2012, DuPont.
U.S. Appl. No. 13/559,657, filed Jul. 27, 2012, DuPont.
U.S. Appl. No. 13/559,655, filed Jul. 27, 2012, DuPont.
PCT International Search Report and Written opinion for International Application No. PCT/US2012/048428 Dated Oct. 15, 2012.
PCT International Search Report and Written opinion for International Application No. PCT/US2012/048429 Dated Sep. 28, 2012.
PCT International Search Report and Written opinion for International Application No. PCT/US2012/048448 Dated Sep. 27, 2012.
PCT International Search Report and Written opinion for International Application No. PCT/US2012/048431 Dated Jul. 2, 2013.
PCT International Search Report and Written opinion for International Application No. PCT/US2012/048434 Dated Sep. 28, 2012.
PCT International Search Report and Written opinion for International Application No. PCT/US2012/048435 Dated Sep. 27, 2012.
PCT International Search Report and Written opinion for International Application No. PCT/US2012/048438 Dated Sep. 28, 2012.
PCT International Search Report and Written opinion for International Application No. PCT/US2012/048439 Dated Sep. 27, 2012.
PCT International Search Report and Written opinion for International Application No. PCT/US2012/048442 Dated Sep. 28, 2012.
PCT International Search Report and Written opinion for International Application No. PCT/US2012/048441 Dated Sep. 28, 2012.
PCT International Search Report and Written opinion for International Application No. PCT/US2012/048444 Dated Sep. 27, 2012.
PCT International Search Report and Written opinion for International Application No. PCT/US2012/048484 Dated Sep. 28, 2012.

* cited by examiner

*Primary Examiner* — Shane Fang

(57) ABSTRACT

The invention concerns processes for forming polymer crumb comprising residues of 2-(4-amino phenyl)-5(6)amino benzimidazole (DAPBI), paraphenylene diamine (PPD), and terephthaloyl dichloride, comprising the steps of: (a) forming a slurry of b mole percent DAPBI and y mole percent PPD in a solvent system comprising organic solvent and c weight percent of an inorganic salt, wherein the inorganic salt is present in an amount of at least 5 weight percent of the organic solvent, DAPBI and PPD being present in an amount sufficient for providing a polymer solution having a weight percent solids of 12 percent or greater on a polymer basis; and (b) contacting the slurry of step a) with a stoichiometric amount of terephthaloyl dichloride to form a product comprising the polymer; wherein the sum of y+b is 100 and the product of b×c is 225 or greater.

23 Claims, No Drawings

PROCESS FOR FORMING AN ARAMID COPOLYMER

TECHNICAL FIELD

The present application concerns methods of producing aramid polymers derived from 5(6)-amino-2-(p-aminophenyl)benzimidazole (DAPBI), para-phenylenediamine (PPD) and terephthaloyl dichloride (TCl) that are capable of forming fibers having superior physical properties.

BACKGROUND

Fibers derived from 5(6)-amino-2-(p-aminophenyl)benzimidazole (DAPBI), para-phenylenediamine (PPD) and terephthaloyl dichloride (TCl, also commonly referred to as terephthaloyl chloride) are known in the art. Such copolymers are the basis for a high strength fibers manufactured in Russia, for example, under the trade names Armos® and Rusar®. See, Russian Patent Application No. 2,045,586. U.S. Pat. No. 4,172,938 discloses a process for making aramid polymer that utilizes a solvent containing at least 1.5 but less than 5 weight percent $CaCl_2$ in N-methyl-2-pyrrolidone (NMP).

Present technology does not permit producing DAPBI-containing aramid polymers in a high solids content reaction while achieving polymer having high inherent viscosity. Such a process would be desirable.

SUMMARY

In some aspects, the invention concerns processes for forming polymer crumb comprising residues of 2-(4-amino phenyl)-5(6) amino benzimidazole (DAPBI), paraphenylene diamine (PPD), and terephthaloyl dichloride (TCI), comprising the steps of: (a) forming a slurry of b mole percent DAPBI and y mole percent PPD in a solvent system comprising organic solvent and c weight percent of an inorganic salt, wherein the inorganic salt is present in an amount of at least 5 weight percent of the organic solvent, DAPBI and PPD being present in an amount sufficient for providing a polymer solution having a weight percent solids of 12 percent or greater on a polymer basis; and (b) contacting the slurry of step a) with a stoichiometric amount of terephthaloyl dichloride to form a product comprising the polymer wherein the sum of y and b is 100 and the product of b×c is 225 or greater. In some embodiments, b×c is 300 or 350 or greater.

The use of higher amounts of inorganic salt (such as $CaCl_2$) has led to a surprising increase in inherent viscosity (at higher solids). This higher inherent viscosity is of utility when producing high molecular weight materials such as fibers. Furthermore, the higher solids content of the polymerization solution reduces costs of manufacture as compared with lower solids reactions.

In some embodiments, the addition of terephthaloyl dichloride in step b) occurs in at least 3 steps. In some reactions, after each addition of terephthaloyl dichloride in step b) prior to the final addition, the product is cooled to a temperature of 15° C. or below. In certain preferred embodiments, step b) is performed under agitation. In some processes, no more than 10 percent of the terephthaloyl dichloride is added in any single addition up to the gel point. The final addition of terephthaloyl dichloride can be done as a single amount so as to allow mixing prior to gelation In certain embodiments, the slurry from step a) is cooled to a temperature of 20° C. or below prior to contacting the slurry with a stoichiometric amount of terephthaloyl dichloride.

In some embodiments, the organic solvent is N-methyl-2-pyrrolidone (NMP) or dimethylacetamide (DMAC). Suitable inorganic salts include LiCl and $CaCl_2$. In some embodiments, the solvent has an inorganic salt weight percent in the range of from 5.0 to 10%.

The polymer can be isolated in some embodiments. The polymer can be treated with one or more washing steps, neutralizing steps, or both. In some embodiments, the polymer can be comminuted. The washing and/or neutralizing steps can be performed before or after comminuting the polymer.

In some aspects, the invention additionally concerns the step of dissolving the polymer in a solvent comprising sulfuric acid to form a solution suitable for spinning fibers. The polymer to be dissolved includes the isolated polymer that may or may not have been washed and/or neutralized and polymer may or may not have been comminuted.

In some embodiments, the process has a molar ratio of DAPBI to PPD is in the range of from 0.25 to 4. For certain processes, the amount of the slurry that is DAPBI in step (a) is in the range of from 2 to 9 weight %. For certain processes, there is 0.8 to 6.0 weight % of paraphenylene diamine in step (a).

The processes of the invention can be run at high solids content. In some embodiments, the weight percent solids in the product solution is 12-15% on a polymer basis. In some processes, the weight percent solids in the product solution is 14-25% on a monomer basis. In some embodiments, the weight percent solids in the product solution is 14-19% on a monomer basis.

In other aspects, the invention concerns polymer comprising residues of 2-(4-amino phenyl)-5(6) amino benzimidazole (DAPBI), paraphenylene diamine (PPD), and terephthaloyl dichloride (TCI), where the polymer is made by a process comprising the steps of: (a) forming a slurry of b mole percent DAPBI and y mole percent PPD in a solvent system comprising organic solvent and c weight percent of an inorganic salt, wherein the inorganic salt is present in an amount of at least 5 weight percent of the organic solvent, DAPBI and PPD being present in an amount sufficient for providing a polymer solution having a weight percent solids of 12 percent or greater on a polymer basis; and (b) contacting the slurry of step a) with a stoichiometric amount of terephthaloyl dichloride to form a product comprising the polymer wherein the sum of y and b is 100 and the product of b×c is 225 or greater. In some embodiments b×c is 300 or 350 or greater.

Some polymer of the invention has a polydispersity index (PDI) of 1 to 2. In some embodiments, the PDI is 1 to 1.8. In certain embodiments, the PDI is 1 to 1.5.

Certain polymer of the invention has an oligomer content of 1.0 weight percent or less. Some polymer has an oligomer content of 0.75 weight percent or less, or in some embodiments, an oligomer content of 0.5 weight percent or less.

DETAILED DESCRIPTION OF ILLUSTRATIVE EMBODIMENTS

In some aspects, the concerns processes for forming polymer crumb comprising residues of 2-(4-amino phenyl)-5(6) amino benzimidazole (DAPBI), paraphenylene diamine (PPD), and terephthaloyl dichloride (TCI), comprising the steps of: (a) forming a slurry of b mole percent DAPBI and y mole percent PPD in a solvent system comprising organic solvent and c weight percent of an inorganic salt, wherein the inorganic salt is present in an amount of at least 5 weight percent of the organic solvent, DAPBI and PPD being present in an amount sufficient for providing a polymer solution having a weight percent solids of 12 percent or greater on a polymer basis; and (b) contacting the slurry of step a) with a stoichiometric amount of terephthaloyl dichloride to form a product comprising the polymer wherein the sum of y and b is 100 and the product of b×c is 225 or greater. In other aspects, the invention concerns polymer crumb comprising residues of 2-(4-amino phenyl)-5(6) amino benzimidazole (DAPBI), paraphenylene diamine (PPD), and terephthaloyl dichloride (TCI), where the polymer is made by a process comprising the steps of: (a) forming a slurry of b mole percent DAPBI and y mole percent PPD in a solvent system comprising organic solvent and c weight percent of an inorganic salt, wherein the inorganic salt is present in an amount of at least 5 weight percent of the organic solvent, DAPBI and PPD being present in an amount sufficient for providing a polymer solution having a weight percent solids of 12 percent or greater on a polymer basis; and (b) contacting the slurry of step a) with a stoichiometric amount of terephthaloyl dichloride to form a product comprising the polymer wherein the sum of y and b is 100 and the product of b×c is 225 or greater.

Vessels useful for producing polymers, and temperatures and other conditions useful in producing polymers, include, for example, details disclosed in such patents as U.S. Pat. No. 3,063,966 to Kwolek et al.; U.S. Pat. No. 3,600,350 to Kwolek; U.S. Pat. No. 4,018,735 to Nakagawa et al.; U.S. Pat. No. 5,646,234 to Jung et al.; U.S. Pat. No. 4,172,938 to Mera; and WO2005054337 to Bos.

The solvent system has an inorganic salt content of at least 5 weight percent, based on the combination of solvent and salt. In some embodiments, it is believed the inorganic salt content can be as high as 12 weight percent. In some preferred embodiments the inorganic salt content is no more than 10 weight percent and in some most preferred embodiments the content is no more than 8 weight percent. Preferred organic solvents include N-methyl-2-pyrrolidone (NMP), dimethylacetamide (DMAC), or mixtures thereof. Preferred inorganic salts include LiCl, $CaCl_2$ and mixtures thereof.

In one preferred embodiment, the solvent system is NMP/$CaCl_2$. In certain embodiments, the NMP/$CaCl_2$ solvent has a $CaCl_2$ weight percent in the range of from 5 to 10%. It should be noted that the solubility of $CaCl_2$ in NMP is about 8%. As such when more than 8% $CaCl_2$ is used, some undissolved $CaCl_2$ is present in the solvent system. The solvents and salts can be obtained from commercial sources and, if desired, purified by methods known to those skilled in the art.

In some processes, the molar ratio of DAPBI to phenylene diamine is in the range of from 0.25 to 4.0. This ratio is equivalent to a DAPBI/PPD ratio of 20/80 to 80/20. In certain processes, the amount of the slurry that is DAPBI in step (a) is in the range of from 2.0 to 9 weight percent of the slurry.

In some embodiments, the polymer crumb is made by copolymerizing: (i) y mole % of PPD; (ii) b mole % of DAPBI; and (iii) 90-110 mole % of TCl in a mixture of organic solvent containing c wt. % of inorganic salt. In preferred embodiments, the sole amine monomers used in the polymerization are PPD and DAPBI. In some embodiments other amine monomers can be present; however, PPD and DAPBI are present in such embodiments such that y+b equals 100, based on the relative amounts of PPD and DAPBI present. The product of b×c is greater than 225. In some embodiments, the product of b×c is greater than 300 and preferably greater than 350.

In some embodiments, the weight percent solids in the product solution is 12-15% on a polymer basis. By "polymer basis" it is meant the weight of the polymer divided by the weight of the total solution of polymer and solvent (and reaction byproducts), expressed as a percentage. By "monomer basis" it is meant the sum of the weights of the individual monomers divided by the weight of the total solution of polymer and solvent (and any reaction byproducts), expressed as a percentage. In some processes, the weight percent solids in the product is 14-25% on a monomer basis. In some embodiments, the weight percent solids in the product is 14-19% on a monomer basis.

In some embodiments, one or more process steps can be performed under agitation.

The polymer can be isolated from the solvent, and in some embodiments the invention concerns a polymer powder comprising residues of 2-(4-amino phenyl)-5(6) amino benzimidazole (DAPBI), paraphenylene diamine, and terephthaloyl dichloride. In some embodiments, the polymer powder has an inherent viscosity of 4 dl/g or greater. In some preferred embodiments, the polymer has an inherent viscosity of 4 to 8 dl/g; in some embodiments the polymer has an inherent viscosity of 6 dl/g or greater.

The isolated polymer can be comminuted to a desired particle size to assist in processing and storage. The polymer can be treated with one or more washing steps, neutralizing steps, or both. These washing and/or neutralizing steps can be performed before or after comminuting the polymer. Equipment suitable for use in agitation of the reaction mixtures, washing and neutralization steps, and comminuting the polymer are known to those skilled in the art.

Molecular weights of polymers are typically monitored by, and correlated to, one or more dilute solution viscosity measurements. Accordingly, dilute solution measurements of the relative viscosity ("$V_{rel}$" or "$\eta_{rel}$" or "$n_{rel}$") and inherent viscosity ("$V_{inh}$" or "$\eta_{inh}$" or "$n_{inh}$") are typically used for monitoring polymer molecular weight. The relative and inherent viscosities of dilute polymer solutions are related according to the expression $$V_{inh}=\ln(V_{rel})/C,$$

where ln is the natural logarithm function and C is the concentration of the polymer solution. $V_{rel}$ is a unitless ratio, thus $V_{inh}$, is expressed in units of inverse concentration, typically as deciliters per gram ("dl/g").

Neutralization of the polymer can occur in one or more steps by contacting the polymer with a base. Suitable bases include NaOH; KOH; $Na_2CO_3$; $NaHCO_3$; $NH_4OH$; $Ca(OH)_2$; $K_2CO_3$; $KHCO_3$; or trialkylamines, preferably tributylamine; other amines; or mixtures thereof. In one embodiment, the base is water soluble. In some preferred examples the neutralization solution is an aqueous solution of base.

The polymer can also be washed with water independent of or prior to and/or after the neutralization step.

In some aspects, the invention additionally concerns the step of dissolving the polymer in a solvent comprising sulfuric acid to form a solution suitable for spinning fibers (also referred to as a "spin dope"). The polymer to be dissolved includes the isolated polymer that may or may not have been washed and/or neutralized and polymer may or may not have been comminuted. While any suitable solvent can be used to dissolve the polymer, in some embodiments the solvent comprises N-methyl-2-pyrrolidone (NMP) or dimethylacetamide (DMAC) and an inorganic salt to form a solution suitable for spinning fibers. The dissolved polymer can be spun into fibers by conventional techniques known to those skilled in the art.

The spin dope containing the copolymer described herein can be spun into dope filaments using any number of processes; however, wet spinning and "air-gap" spinning are the best known. The general arrangement of the spinnerets and baths for these spinning processes is well known in the art, with the figures in U.S. Pat. Nos. 3,227,793; 3,414,645;

3,767,756; and 5,667,743 being illustrative of such spinning processes for high strength polymers. In "air-gap" spinning the spinneret typically extrudes the fiber first into a gas, such as air, prior to being coagulated in a aqueous bath. This is a preferred method for forming filaments As used herein, the terms filaments and fibers are used interchangeably.

The fiber can be contacted with one or more washing baths or cabinets. Washes can be accomplished by immersing the fiber into a bath or by spraying the fiber with the aqueous solution. Washing cabinets typically comprise an enclosed cabinet containing one or more rolls that the yarn travels around a number of times, and across, prior to exiting the cabinet. As the yarn travels around the roll, it is sprayed with a washing fluid. The washing fluid is continuously collected in the bottom of the cabinet and drained therefrom.

The temperature of the washing fluid(s) is preferably greater than 30° C. The washing fluid can also be applied in vapor form (steam), but is more conveniently used in liquid form. Preferably, a number of washing baths or cabinets are used. The residence time of the yarn in any one washing bath or cabinet will depend on the desired concentration of residual sulfur in the yarn. In a continuous process, the duration of the entire washing process in the preferred multiple washing bath(s) and/or cabinet(s) is preferably no greater than about 10 minutes, more preferably greater than about 5 seconds. In some embodiments the duration of the entire washing process is 20 seconds or more; in some embodiments the entire washing is accomplished in 400 seconds or less. In a batch process, the duration of the entire washing process can be on the order of hours, as much as 12 to 24 hours or more.

If needed, neutralization of the acid (such as sulfuric acid solvent) in the yarn by a base can occur in a bath or a cabinet. In some embodiments, the neutralization bath or cabinet can follow one or more washing baths or cabinets. Washes can be accomplished by immersing the fiber into a bath or by spraying the fiber with the aqueous solution. Neutralization can occur in one bath or cabinet or in multiple baths or cabinets. In some embodiments, preferred bases for the neutralization of sulfuric acid impurity include NaOH; KOH; $Na_2CO_3$; $NaHCO_3$; $NH_4OH$; $Ca(OH)_2$; $K_2CO_3$; $KHCO_3$; or trialkylamines, preferably tributylamine; other amines; or mixtures thereof. In one embodiment, the base is water soluble. In some preferred examples the neutralization solution is an aqueous solution containing 0.01 to 1.25 mols of base per liter, preferably 0.01 to 0.5 mols of base per liter. The amount of cation is also dependent on the time and temperature of exposure to the base and the washing method. In some preferred embodiments, the base is NaOH or $Ca(OH)_2$.

After treating the fiber with base, the process optionally can include the step of contacting the yarn with a washing solution containing water or an acid to remove all or substantially all excess base. This washing solution can be applied in one or more washing baths or cabinets.

After washing and neutralization, the fiber or yarn can be dried in a dryer to remove water and other liquids. One or more dryers can be used. In certain embodiments, the dryer can be an oven that uses heated air to dry the fibers. In other embodiments, heated rolls can be used to heat the fibers. The fiber is heated in the dryer to a temperature of at least about 20° C. but less than about 100° C. until the moisture content of the fiber is 20 weight percent of the fiber or less. In some embodiments the fiber is heated to 85° C. or less. In some embodiments the fiber is heated under those conditions until the moisture content of the fiber is 14 weight percent of the fiber or less. In some embodiments, the fiber is heated at least to about 30° C.; in some embodiments the fiber is heated at least to about 40° C.

The dryer residence time is less than ten minutes and is preferably less than 180 seconds. The dryer can be provided with a nitrogen or other non-reactive atmosphere. The drying step typically is performed at atmospheric pressure. If desired, however, the step can be performed under reduced pressure. In one embodiment, the filaments are dried under a tension of at least 0.1 gpd, preferably a tension of 2 gpd or greater.

DEFINITIONS

As used herein, the term "residue" of a chemical species refers to the moiety that is the resulting product of the chemical species in a particular reaction scheme or subsequent formulation or chemical product, regardless of whether the moiety is actually obtained from the chemical species. Thus, a copolymer comprising residues of paraphenylene diamine refers to a copolymer having one or more units of the formula:

Similarly, a copolymer comprising residues of DAPBI contains one or more units of the structure:

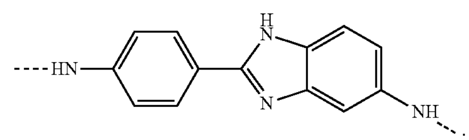

A copolymer having residues of terephthaloyl dichloride contains one or more units of the formula:

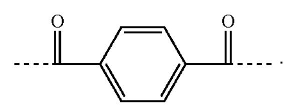

The term "polymer," as used herein, means a polymeric compound prepared by polymerizing monomers, whether of the same or a different type. The term "copolymer" (which refers to polymers prepared from two different monomers), the term "terpolymer" (which refers to polymers prepared from three different types of monomers), and the term "quad-polymer (which refers to polymers having four different types of monomers) are included in the definition of polymer.

The "polydispersity index" (PDI), is a measure of the distribution of molecular mass in a given polymer sample. The PDI calculated is the weight average molecular weight divided by the number average molecular weight. It indicates the distribution of individual molecular masses in a batch of polymers. The PDI has a value equal to or greater than 1, but as the polymer chains approach uniform chain length, the PDI approaches unity. The PDI from polymerization is often denoted as:

$$PDI = Mw/Mn$$

By "oligomer," it is meant polymers or species eluting out at <3000 MW with a column calibrated using polyparaphenylene diamine terephthalamide homopolymer.

The term "crumb" means the polymer has breakable clumps or particles that generally have an effective particle diameter of greater than 100 micrometers, sometimes greater than 1 mm. In some embodiments, crumb further includes coarse powders having an effective particle diameter of 1000 micrometers or less. Effective particle diameter is the diameter of a circle with area equal to that of the projection of the particle on a plane. The term "powder" when referring to polymer means particles of the copolymer having neither fibrous qualities like fiber or pulp, nor fibrous film-like qualities like fibrids. Individual particles tend to be fibril-free, have a random shape, and in some embodiments have an effective particle diameter of 840 micrometers or less. U.S. Pat. Nos. 5,474,842 and 5,811,042 are illustrative.

As used herein, "stoichiometric amount" means the amount of a component theoretically needed to react with all of the reactive groups of a second component. For example, "stoichiometric amount" refers to the moles of terephthaloyl dichloride needed to react with substantially all of the amine groups of the amine component (paraphenylene diamine and DAPBI). It is understood by those skilled in the art that the term "stoichiometric amount" refers to a range of amounts that are typically within 10% of the theoretical amount. For example, the stoichiometric amount of terephthaloyl dichloride used in a polymerization reaction can be 90-110% of the amount of terephthaloyl dichloride theoretically needed to react with all of the paraphenylene diamine and DAPBI amine groups.

The "fiber" refers to a relatively flexible, macroscopically homogeneous body having a high ratio of length to width across its cross-sectional area perpendicular to its length.

The term "organic solvent" is understood herein to include a single component organic solvent or a mixture of two or more organic solvents. In some embodiments, the organic solvent is dimethylformamide, dimethylacetamide (DMAC), N-methyl-2-pyrrolidone (NMP), or dimethylsulfoxide. In some preferred embodiments, the organic solvent is N-methyl-2-pyrrolidone or dimethylacetamide.

The term "inorganic salt" refers to a single inorganic salt or to a mixture of two or more inorganic salts. In some embodiments, the inorganic salt is sufficiently soluble in the solvent and liberates an ion of a halogen atom. In some embodiments, the preferred inorganic salt is KCl, $ZnCl_2$, LiCl or $CaCl_2$. In certain preferred embodiments, the inorganic salt is LiCl or $CaCl_2$.

By "never-dried" it is meant the moisture content of the fiber is at least 75 weight percent of the fiber.

As used in the specification including the appended claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable. When any variable occurs more than one time in any constituent or in any formula, its definition in each occurrence is independent of its definition at every other occurrence. Combinations of substituents and/or variables are permissible only if such combinations result in stable compounds.

The invention is illustrated by the following examples, which are not intended to be limiting in nature.

Test Methods

Inherent viscosity can be determined using a solution in which a polymer is dissolved in a concentrated sulfuric acid with a concentration of 96 wt % at a polymer concentration (C) of 0.5 g/dl and at a temperature of 25° C. Inherent viscosity is then calculated as $\ln (t_{poly}/t_{solv})/C$ where $t_{poly}$ is the drop time for the polymer solution and $t_{solv}$ is the drop time of the pure solvent.

The molecular weights used to calculate the polydispersity index (PDI) are determined by Size Exclusion Chromatography (SEC). The oligomer content of copolymers is also determined by inspection of the traces by comparison with calibration curves generated from PPD-T homopolymer. The SEC system is a PL-GPC50TM chromatography system customized for full compatibility with strong acid mobile phase (available from Agilent Technologies, Santa Clara, Calif., USA). A variable wavelength UV detector (190-740 nm wavelengths) customized for application in strong acid mobile phase (from Agilent) is used. The software used for data reduction is Empower 2TM Data Manager with GPC option (Waters Technologies, Milford, Mass., USA). The columns used for separation are a series of two silica-based SEC columns from Agilent: Zorbax PSM bimodal (6.2×250 mm, 5 micron particle size) and Zorbax PSM 60 (6.2×250 mm, 5 micron particle size), both with customized frits for acid applications. The mobile phase is methanesulfonic acid (MSA, 99% extra pure from Acros Organics, N.J., USA) with 1.09 g/L nitric acid (69.0-70.0% from J. T Baker (N.J., USA). The chromatographic conditions are (a) Temperature: ambient; (b) flow rate: 0.08 ml/min; (c) injection volume: 10 microliters; (d) run time: 140 min.; (e) UV detector wavelength: 320 nm; and (f) sample solution: 0.2 mg/mL in 100% MSA. The samples are prepared by overnight dissolution in 100% MSA at ambient temperature with moderate agitation (Automatic sample preparation system PL 260 TM from Agilent). The data reduction method is a single detection method incorporating data from a UV detector. The column calibration is performed using previously characterized PPD-T homopolymer and its oligomers as broad and narrow standards. Molecular weight distribution, average molecular weights and weight percent of low molecular weight fractions are calculated using a standard single detector GPC method incorporated in the Empower software.

EXAMPLES

NMP, $CaCl_2$, DAPBI, PPD, and TCl were obtained from commercial sources.

Comparison Example 1

31.82 kg of NMP Solvent containing 2.94% $CaCl_2$ (a "c" value of 2.94) was charged to a FM130D Littleford Reactor. 456 g of PPD (an "y" value of 30) and 2200 g of DAPBI (a "b" value of 70) were then charged. Process was then cooled to 7° C. Three additions of terephthaloyl dichloride were made: 997 g, 997 g, and 855 g. After the first addition, the mixture was cooled to 7 C and after the second the mixture was cooled to 11° C. On conclusion of reaction, the reactor was inspected for deposits, no large chunks of DAPBI were observed on the wall. The product of (b×c) was equal to 206.

Solids in this reaction were 12% on a polymer basis and 14.7% on a total monomer basis. Final inherent viscosity was 3.9.

Comparison Example 2

31.82 kg of NMP Solvent containing 3.91% $CaCl_2$ (a "c" value of 3.91) was charged to a FM130D Littleford Reactor.

455 g of PPD (an “y” value of 30) and 2202 g of DAPBI (a “b” value of 70) were then charged. Process was then cooled to 8° C. Three additions of terephthaloyl dichloride were made: 997 g, 997 g, and 853 g. After the first addition, the mixture was cooled to 10 C and after the second the mixture was cooled to 12° C. On conclusion of reaction, the reactor was inspected for deposits, no large chunks of DAPBI were observed on the wall. The product of (b×c) was equal to 274.

Solids in this reaction were 12% on a polymer basis and 14.7% on a total monomer basis. Final inherent viscosity was 4.6.

Example 1

31.82 kg of NMP Solvent containing 5.38% $CaCl_2$ (a “c” value of 5.38) was charged to a FM130D Littleford Reactor. 455 g of PPD (an “y” value of 30) and 2180 g of DAPBI (a “b” value of 70) were then charged. Process was then cooled to 7° C. Three additions of terephthaloyl dichloride were made: 998 g, 997 g, and 834 g. After the first addition, the mixture was cooled to 10 C and after the second the mixture was cooled to 10° C. On conclusion of reaction, the reactor was inspected for deposits, no large chunks of DAPBI were observed on the wall. The product of (b×c) was equal to 377.

Solids in this reaction were 12% on a polymer basis and 14.7% on a total monomer basis. Final inherent viscosity was 7.5. The final polymer had a polydispersity of about 1.5 and a oligomeric content <3000 MW of about 0.45%.

Comparison Example 3

35.21 kg of NMP Solvent containing 2.43% $CaCl_2$ (a “c” value of 2.43) was charged to a FM130D Littleford Reactor. 455 g of PPD (an “y” value of 30) and 2199 g of DAPBI (a “b” value of 70) were then charged. Process was then cooled to 9° C. Three additions of terephthaloyl dichloride were made: 996 g, 995 g, and 853 g. After the first addition, the mixture was cooled to 10 C and after the second the mixture was cooled to 11° C. On conclusion of reaction, the reactor was inspected for deposits, no large chunks of DAPBI were observed on the wall. The product of (b×c) was equal to 170.

Solids in this reaction were 11% on a polymer basis and 13.4% on a total monomer basis. Final inherent viscosity was 6.4.

Example 2

31.36 kg of NMP Solvent containing 5.91% $CaCl_2$ (a “c” value of 5.91) was charged to a FM130D Littleford Reactor. 493 g of PPD (an “y” value of 30) and 2382 g of DAPBI (a “b” value of 70) were then charged. Process was then cooled to 8° C. Three additions of terephthaloyl dichloride were made: 772 g, 773 g, and 1538 g. After the first addition, the mixture was cooled to 10 C and after the second the mixture was cooled to 11° C. On conclusion of reaction, the reactor was inspected for deposits, no large chunks of DAPBI were observed on the wall. The product of (b×c) was equal to 414.

Solids in this reaction were 13% on a polymer basis and 16.0% on a total monomer basis. Final inherent viscosity was 7.1.

Example 3

A polymer is prepared using the process of Example 2, and the weight average molecular weight and the number average molecular weight are found. This polymer has a PDI of less than 1.5.

Example 4

34.08 kg of NMP Solvent containing 2.4% $CaCl_2$ (a “c” value of 2.4) was charged to a reactor. 459 g of PPD (an “y” value of 30) and 2212 g of DAPBI (a “b” value of 70) were then charged. Process was then cooled to 20° C. Two additions of terephthaloyl dichloride were made: 1003 g and 1862 g. After the first addition, the mixture was cooled to 9 C. On conclusion of reaction, the reactor was inspected for deposits, no large chunks of DAPBI were observed on the wall. The product of (b×c) was equal to 168.

Solids in this reaction were 11% on a polymer basis and 14.0% on a total monomer basis. Final inherent viscosity was 5.6. The final polymer had a polydispersity of 1.87 and a oligomeric content <3000 MW of 0.87%

Example 5

1780 parts of NMP Solvent containing 2.0% $CaCl_2$ (a “c” value of 2.0) was charged to a reactor. 23 parts of PPD (an “y” value of 30) and 111.2 parts of DAPBI (a “b” value of 70) were then charged. Process was then cooled to 9° C. Two additions of terephthaloyl dichloride were made: 50.4 parts each. After the first addition, the mixture was recooled to 8 C. A final terephthaloyl chloride addition was then made of 43.2 parts. On conclusion of reaction, the reactor was inspected for deposits, no large chunks of DAPBI were observed on the wall. The product of (b×c) was equal to 140.

Solids in this reaction were 11% on a polymer basis and 14.0% on a total monomer basis. Final inherent viscosity was 4.8. The final polymer had a polydispersity of 1.90 and a oligomeric content <3000 MW of 0.95%

Example 6

The polymers of Examples 1 and 2 are individually combined with either (1) a solvent comprising sulfuric acid or (2) a solvent comprising N-methyl-2-pyrrolidone (NMP) or dimethylacetamide (DMAC) and an inorganic salt. The combination is agitated, while cooling if needed to control temperature, until the polymer is fully dissolved in the solvent and a solution suitable for spinning fibers is formed. The solution is extruded through a spinneret and air-gap spun and coagulated into filaments that are washed, are dried, and are wound on a bobbin.

What is claimed:

1. A process for forming a polymer crumb comprising residues of 2-(4-amino phenyl)-5(6) amino phenyl benzimidazole (DAPBI), paraphenylene diamine (PPD), and terephthaloyl dichloride, comprising the steps of:

a) forming a slurry of b mole percent DAPBI and y mole percent PPD in a solvent system comprising organic solvent and c weight percent of an inorganic salt, wherein the inorganic salt is present in an amount of at least 5 weight percent of the organic solvent, DAPBI and PPD being present in an amount sufficient for providing a polymer solution having a weight percent solids of 12 percent or greater on a polymer basis; and b) contacting the slurry of step a) with a stoichiometric amount of terephthaloyl dichloride to form a product comprising said polymer wherein the sum of y+b is 100 and the product of b×c is 225 or greater;

wherein the weight percent solids in the product is 14-25% on a monomer basis.

2. A process for forming a polymer crumb comprising residues of 2-(4-amino phenyl)-5(6) amino phenyl benzimidazole (DAPBI), paraphenylene diamine (PPD), and terephthaloyl dichloride, comprising the steps of:

a) forming a slurry of b mole percent DAPBI and y mole percent PPD in a solvent system comprising organic solvent and c weight percent of an inorganic salt, wherein the inorganic salt is present in an amount of at least 5 weight percent of the organic solvent, DAPBI and PPD being present in an amount sufficient for providing a polymer solution having a weight percent solids of 12 percent or greater on a polymer basis; and b) contacting the slurry of step a) with a stoichiometric amount of terephthaloyl dichloride to form a product comprising said polymer wherein the sum of y+b is 100 and the product of b×c is 225 or greater:

wherein the addition of terephthaloyl dichloride in step b) occurs in at least 3 steps; and wherein no more than 10 percent of the terephthaloyl dichloride is added in any single addition of terephthaloyl dichloride prior to the gel point of the polymerization.

3. The process of claim 1 or 2, wherein the product of (b×c) is equal to 300 or greater.

4. The process of claim 3, wherein the product of (b×c) is equal to 350 or greater.

5. The process of claim 1, wherein the addition of terephthaloyl dichloride in step b) occurs in at least 3 steps.

6. The process of claim 1 or 2, wherein the slurry from step a) is cooled to a temperature of 20° C. or below prior to contacting said slurry with a stoichiometric amount of terephthaloyl dichloride.

7. The process of claim 5 or 2, wherein after each addition of terephthaloyl dichloride in step b) prior to the final addition, the product is cooled to a temperature of 15° C. or below.

8. The process of claim 1 or 2, wherein the organic solvent is N-methyl-2-pyrrolidone (NMP) or dimethylacetamide (DMAC).

9. The process of claim 1 or 2, wherein the inorganic salt is LiCI or $CaCl_2$.

10. The process of claim 1 or 2, wherein the organic solvent is NMP and the inorganic salt is $CaCl_2$.

11. The process of claim 1 or 2, wherein step b) is performed under agitation.

12. The process of claim 1 or 2, further comprising isolating said polymer from said solvent system.

13. The process of claim 12, further comprising the step of comminuting the polymer.

14. The process of claim 12, further comprising treating the polymer with one or more washing steps, neutralizing steps, or both.

15. The process of claim 13, further comprising treating the polymer with one or more washing steps, neutralizing steps, or both.

16. The process of claim 14, further comprising the step of drying and then dissolving the polymer in a solvent comprising sulfuric acid to form a solution suitable for spinning fibers.

17. The process of claim 15, further comprising the step of drying and then dissolving the polymer in a solvent comprising sulfuric acid to form a solution suitable for spinning fibers.

18. The process of claim 1 or 2, wherein the DAPBI and PPD are present in a molar ratio in the range of from 0.25 to 4.

19. The process of claim 1 or 2, wherein the solvent has an inorganic salt weight percent in the range of from 5.0 to 10%.

20. The process of claim 1 or 2, wherein the amount of DAPBI used in forming the slurry in step (a) is in the range of from 2 to 9 weight %.

21. The process of claim 1 or 2, comprising 0.8 to 6.0 weight % of paraphenylene diamine in step (a).

22. The process of claim 1 or 2, wherein the weight percent solids in the product is 12-15% on a polymer basis.

23. The process of claim 1 wherein the weight percent solids in the product is 14-19% on a monomer basis.

* * * * *